United States Patent [19]

Tsukamoto et al.

[11] Patent Number: 5,542,887
[45] Date of Patent: Aug. 6, 1996

[54] AUTOMATIC TRANSMISSION CONTROL APPARATUS

[75] Inventors: Kazumasa Tsukamoto, Toyota; Masahiro Hayabuchi; Masaaki Nishida, both of Anjo; Yoshihisa Yamamoto, Nishio; Muneo Kusafuka, Anjo; Kazuhiro Mikami, Kariya; Hiroshi Tsutsui, Nishio; Akihito Iwata, Hekinan, all of Japan

[73] Assignee: Aisin Aw Co., Ltd., Japan

[21] Appl. No.: 428,968

[22] Filed: Apr. 25, 1995

[30] Foreign Application Priority Data

Apr. 25, 1994 [JP] Japan .................................. 6-086904

[51] Int. Cl.⁶ ........................................... F16H 61/20
[52] U.S. Cl. ........................................... 475/63
[58] Field of Search ........................... 475/62, 63

[56] References Cited

U.S. PATENT DOCUMENTS

| | | | |
|---|---|---|---|
| 3,640,151 | 2/1972 | Sumiyoshi et al. | 475/63 |
| 3,662,621 | 5/1972 | Hirozawa | 475/63 |
| 3,690,197 | 9/1972 | Sumiyoshi et al. | 475/63 |
| 3,738,193 | 6/1973 | Sumiyoshi et al. | 475/63 |
| 3,752,011 | 8/1973 | Casey et al. | 475/63 |
| 3,765,271 | 10/1973 | Dach et al. | 475/63 |
| 4,485,443 | 11/1984 | Knodler et al. | 475/63 |
| 4,643,049 | 2/1987 | Nishikawa et al. | 74/868 |
| 4,651,593 | 3/1987 | Aoki et al. | 475/62 |
| 4,775,938 | 10/1988 | Hiramatsu | 364/424 |
| 5,272,630 | 12/1993 | Brown et al. | 364/424 |

*Primary Examiner*—Dirk Wright
*Attorney, Agent, or Firm*—Lorusso & Loud

[57] ABSTRACT

An automatic transmission control system providing a neutral control state in which there is no slipping engagement of a first clutch which is engaged upon selection of a forward range and, as a result, the vehicle is not subjected to idling vibration. The fuel consumption reducing effect of the neutral control state is maintained and there is no heating and consequent deterioration of the friction material of the clutch. The control system includes a hydraulic servo for operation of the clutch, an input side speed sensor for detecting the input side speed of a fluid power coupling device connecting the transmission to the output of an engine, an output side speed sensor for detecting the output side speed of the fluid power coupling device, and a controller. The controller includes differential speed calculator, differential speed change detector, a pressure increasing device for increasing the hydraulic pressure of the hydraulic servo by a set pressure when the differential speed has not changed, and a pressure reducing device for reducing the hydraulic pressure of the hydraulic servo by a set pressure when the differential speed has changed.

14 Claims, 12 Drawing Sheets

|  | Solenoid ||| Clutch ||| Brake |||| One-way Clutch |||
|---|---|---|---|---|---|---|---|---|---|---|---|---|---|
|  | S1 | S2 | S3 | C1 | C2 | C3 | B1 | B2 | B3 | B4 | F1 | F2 | F3 |
| R | × | ○ | × | × | ○ | × | × | × | ○ | ○ | × | × | × |
| N | × | ○ | × | × | × | × | × | × | × | ○ | × | × | × |
| D 1ST | × | ○ | △ | ○ | × | × | × | × | (○) | ○ | × | ○ | ○ |
| D 2ND | ○ | ○ | △ | ○ | × | × | ○ | ○ | × | ○ | ○ | × | ○ |
| D 3RD | ○ | × | × | ○ | × | ○ | ○ | ○ | × | × | ○ | × | × |
| D 4TH | × | × | × | ○ | ○ | ○ | × | ○ | × | × | × | × | × |

FIG. 3

AUTOMATIC TRANSMISSION CONTROL APPARATUS

BACKGROUND OF THE INVENTION

This invention relates to an automatic transmission control apparatus.

Conventionally, an automatic transmission has a torque convertor for receiving rotation output by the engine and a gearbox having planetary gear units, each made up of a plurality of gear elements. Gear-changing is effected based on the vehicle speed, throttle opening and the like in accordance with a preset gear-changing pattern.

In a conventional automatic transmission, ranges such as P (parking) range, R (reverse) range, N (neutral) range, D (drive) range, S (second) range and L (low) range can be selected.

For example when changing from the D range to the N range by operation of a shift lever, the rotation of the idling engine is transmitted through the torque convertor to the gearbox and a creep phenomenon may occur wherein the vehicle creeps forward even if the accelerator pedal is not being depressed.

This creep phenomenon is prevented by a neutral state achieved by a forward clutch, or first clutch, which is engaged when the gearbox is in a forward gear, being allowed to slip when a range for moving the vehicle forward (hereinafter referred to as a "forward range") such as the D range, the S range or the L range is selected, the accelerator pedal is released, the brake pedal is depressed, and it is detected that the vehicle speed is substantially "0".

With the engine idling during D range travel, the oil pressure supplied to the hydraulic servo of the first clutch is feedback-controlled and a state of slipping engagement is created so that the input-output speed differential of the torque convertor becomes a value predetermined as necessary to prevent the creep phenomenon from occurring (cf. U.S. Pat. No. 4,775,938).

In this kind of artificial neutral state (hereinafter called "the neutral control state"), for example when the accelerator pedal is depressed and the first clutch is reengaged, delay of engagement due to stroke loss of the first clutch piston, engine racing and engagement shock can be prevented.

However, in the prior art automatic transmission control referred to above, because the neutral control state is created by the first clutch being brought into a state of slipping engagement, some of the input torque from the engine is transmitted to the gearbox, thus subjecting the vehicle to idling vibration, diminishing fuel consumption and reducing the intended effectiveness of the artificial neutral state.

Also, because the first clutch slips as it transmits torque to its output side, the friction material of the first clutch is heated, thus reducing the useful service life of the friction material.

SUMMARY OF THE INVENTION

An object of this invention is to solve the problems described above associated with the conventional automatic transmission control apparatus and to provide an automatic transmission control apparatus with which the vehicle is not subject to idling vibration, reduced fuel consumption or diminution of the intended effect of the artificial neutral state. Another object is to reduce the heating of the clutch friction material and to prolong its useful service life.

To achieve these and other objects, an automatic transmission control apparatus according to this invention creates a neutral control state when a forward travel range is selected, when the vehicle is at a standstill and when the engine is idling. A fluid power transmission device (fluid coupling or torque converter) transmits the rotation of the engine to the gearbox of the transmission. The transmission includes a clutch which is engaged when a forward travel range is selected and a hydraulic servo for engaging the clutch and which, in turn, actuated by a supply of oil pressure. The control system includes an input side speed sensor for detecting the input side speed of the fluid power transmission device; an output side speed sensor for detecting the output side speed of the fluid power transmission device; and a control device for controlling the oil pressure of the hydraulic servo.

The control device comprises: differential speed calculating means for calculating the differential speed between the input side speed and the output side speed of the fluid power transmission device based on signals from the input side speed sensor and the output side speed sensor; differential speed change judging means for judging at intervals of a set time whether or not the differential speed calculated by the differential speed calculating means has changed; pressure increasing means for increasing the oil pressure of the hydraulic servo by a set pressure when the differential speed has not changed; and pressure reducing means for reducing the oil pressure of the hydraulic servo by a set pressure when the differential speed has changed.

In another embodiment of the automatic transmission control apparatus according to the invention, the differential speed change judging means judges the differential speed to have changed when the differential speed has changed by an amount greater than a set (predetermined) value.

In a further embodiment of the automatic transmission control apparatus according to the invention, the differential speed judging means judges whether or not the differential speed is decreasing, and when the differential speed is decreasing the oil pressure of the hydraulic servo is held at its value as of that time.

In yet another embodiment of the automatic transmission control apparatus according to the invention, during each set interval of time the differential speed change judging means judges whether or not the differential speed is increasing, and when the differential speed is increasing the oil pressure of the hydraulic servo is reduced by a set pressure.

In still another embodiment, the control device comprises initial pressure reduction means for gradually reducing the oil pressure of the hydraulic servo when the following conditions are satisfied: (1) a forward range has been selected, (2) the vehicle is at a standstill and (3) the engine is idling; and release judging means for judging whether or not the clutch has been released as far as a set (predetermined) state by the pressure reduction effected by the initial pressure reduction means. In this embodiment the differential speed change judging means judges whether or not the differential speed has changed when the clutch has been released as far as the set state. In this case, when the pressure reduction effected by the initial pressure reduction means is stopped, the clutch can be reliably brought into a state of readiness for slipping engagement.

In yet another embodiment the control device includes initial pressure reduction means for reducing the oil pressure of the hydraulic servo when a forward range is selected, the vehicle is at a standstill and the engine is idling; release judging means for judging whether or not the clutch has been released as far as a set state by the pressure reduction effected by the initial pressure reduction means; differential speed calculating means for calculating the differential in speed between the input side speed and the output side speed of the fluid power transmission device based on signals from the input side speed sensor and the output side speed sensor; initial pressure reduction stopping means for stopping the pressure reduction effected by the initial pressure reduction means when the clutch has been released as far as a set (predetermined) state; setting means for setting the differential speed, as of the point in time when the pressure reduction has stopped, as a reference differential speed; differential speed change judging means, which comes into operation after the pressure reduction effected by the initial pressure reduction means has been completed, for judging at set intervals of time whether or not the difference between the differential speed calculated by the differential speed calculating means at that time and the reference differential speed is greater than a set (predetermined) value. The control device of this embodiment further includes pressure increasing means for increasing the oil pressure of the hydraulic servo by a set increment of pressure when said difference is below a set value; and pressure reducing means for reducing the oil pressure of the hydraulic servo by a set increment of pressure when said difference is greater than a set value.

The differential speed change judging means resets the reference differential speed used in calculating the difference which determines operation of the pressure increasing means or the pressure reducing means. Thus, the oil pressure of the hydraulic servo can be reliably controlled even if the differential speed changes very slowly as the clutch is shifting to the engaged state.

In another embodiment according to the invention, when the difference between the calculated differential speed and the reference differential speed is greater than a set value, the differential speed change judging means judges whether or not the differential speed is decreasing, and when the differential speed is decreasing the oil pressure of the hydraulic servo is held at its value as of that time. In this case, the clutch piston is prevented from suddenly retracting and, thereby, excessive stroke loss is prevented.

In another embodiment according to the invention, when said difference is greater than a set value, the differential speed change judging means judges at each set time interval whether or not the differential speed is increasing, and when the differential speed is increasing the oil pressure of the hydraulic servo is reduced by a set increment of pressure and the reference differential speed for calculating said difference is reset.

In another automatic transmission control apparatus according to the invention, the control device further comprises delaying means for, starting from that point in time when the release judging means judges the clutch to have been released and ending after lapse of a set time period, (1) holding the oil pressure of the hydraulic servo at its value as of when the release judging means judged the clutch to have been released and (2) delaying the start of the judgment of the differential speed change judging means.

The state of engagement of the clutch is indicated by whether or not the differential in speed between the input side speed and the output side speed has changed, and when there is no change in that differential, i.e. when the clutch has been released, the oil pressure of the hydraulic servo is increased and the hydraulic servo is thereby driven to engage the clutch. When there is a change in the differential speed, i.e. when slipping engagement of the clutch starts, the oil pressure of the hydraulic servo is reduced and the clutch is released.

By repetition of the foregoing operation, the clutch hydraulic servo can keep the clutch in a state wherein there is almost no loss of stroke and in readiness for start of slipping engagement.

As a result, the occurrence of delay in engagement due to loss of stroke of the clutch piston, engine racing and engagement shock in the neutral control state when the accelerator pedal is depressed and the clutch is reengaged can be prevented.

Also, because no slipping engagement occurs in the neutral control state, the vehicle is not subject to idling vibration and the beneficial effect of reduced fuel consumption in the neutral control state is not diminished. Furthermore, there is no heating of the frictional material of the clutch and, consequently, no loss of life of the frictional material.

Normally, when the oil pressure supplied to the hydraulic servo is changed there is a time lag between the oil pressure ordered by the oil pressure control device and the actual oil pressure change in the hydraulic servo; however, because in the control system described above, the amount of change in the differential speed is judged at predetermined intervals of time, the oil pressure is not further (incorrectly) changed during the time lag.

When the engine idling speed changes, the input side speed also changes, but the output side speed correspondingly changes also. As a result, when a change in the differential speed is detected to be associated with a change in the idling speed, it is not incorrectly determined that the clutch is engaged.

The differential speed change judging means judges, at set intervals of time, whether or not the differential speed is increasing, and when the differential speed is increasing the oil pressure of the hydraulic servo is reduced by a set pressure. In this manner, the clutch can be prevented from coming into slipping engagement and idling vibration can be prevented without waiting for the set time to elapse.

The present invention delays adjustment of oil pressure to the hydraulic servo for a period immediately following release of the clutch, during which period the clutch is in an unstable state.

BRIEF DESCRIPTION OF THE DRAWINGS

FIG. 3 is a table showing the operation of the automatic transmission of FIG. 2;

DETAILED DESCRIPTION OF THE PREFERRED EMBODIMENTS

A preferred embodiment of the invention will now be described in detail with reference to the accompanying drawings.

Figure 1:
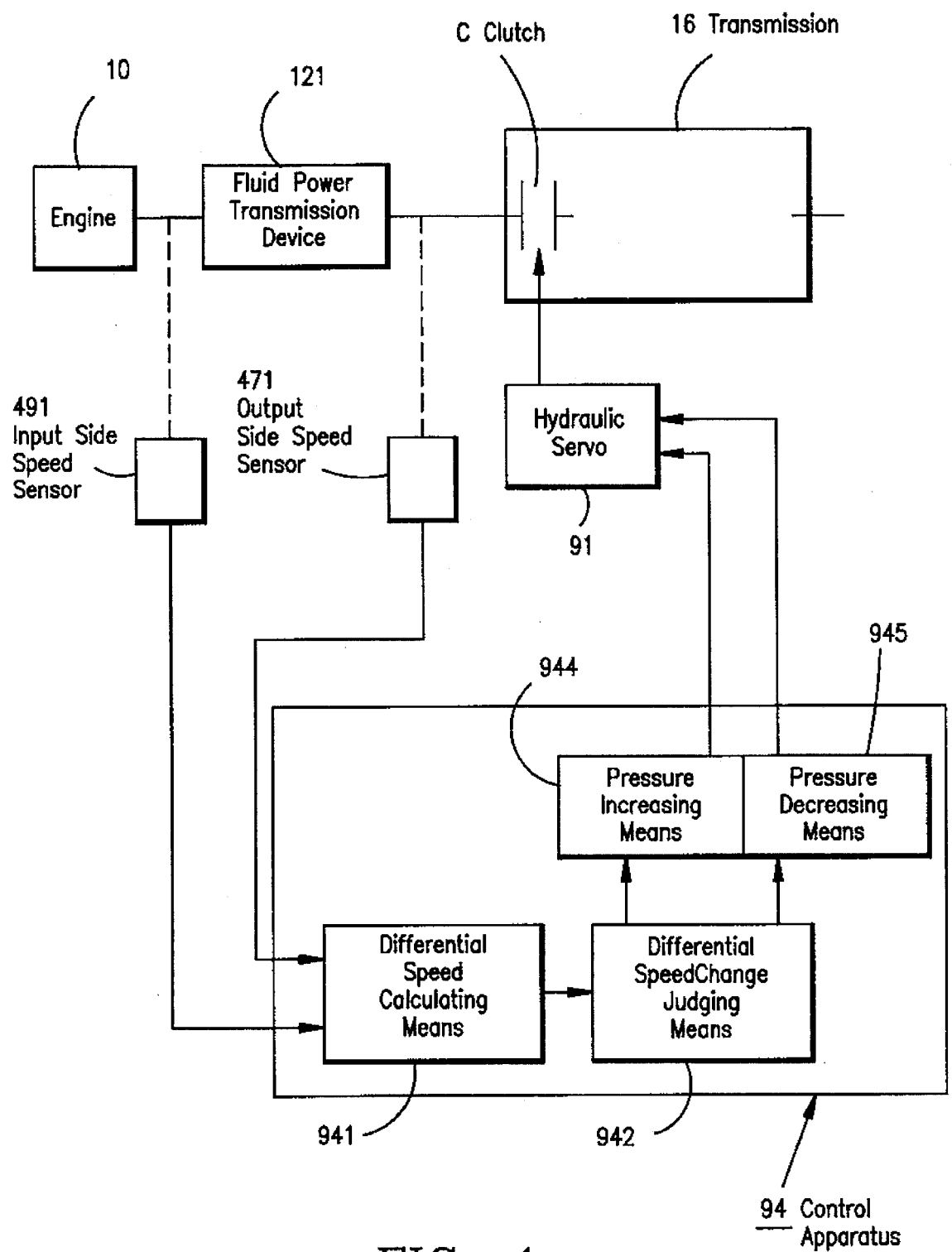
FIG. 1 is a block diagram of an automatic transmission equipped with an automatic transmission control apparatus according to a preferred embodiment of the invention.

As shown in FIG. 1, an engine drivetrain includes a fluid power transmission device 121 (fluid coupling or torque converter) which transmits the rotation of an engine 10 to a gearbox 16, a clutch C which is engaged when a forward range is selected, a hydraulic servo 91 for engaging the clutch C, an input side speed sensor 491 for detecting the input side speed of the fluid power transmission device 121, an output side speed sensor 471 for detecting the output side speed of the fluid power transmission device 121, and a control apparatus 94 for controlling the oil pressure of the hydraulic servo 91.

The control apparatus 94 includes differential speed calculating means 941 for calculating the differential in speed between the input side speed and the output side speed of the fluid power transmission device 121, based on signals from the input side speed sensor 491 and the output side speed sensor 471, differential speed change judging means 942 for judging at set intervals of time whether or not the differential speed calculated by the differential speed calculating means 941 has changed, pressure increasing means 944 for increasing the hydraulic pressure of the hydraulic servo 91 by a set pressure when the differential speed has not changed, and pressure reducing means 945 for reducing the hydraulic pressure of the hydraulic servo 91 by a set pressure when the differential speed has changed.

Figure 2:
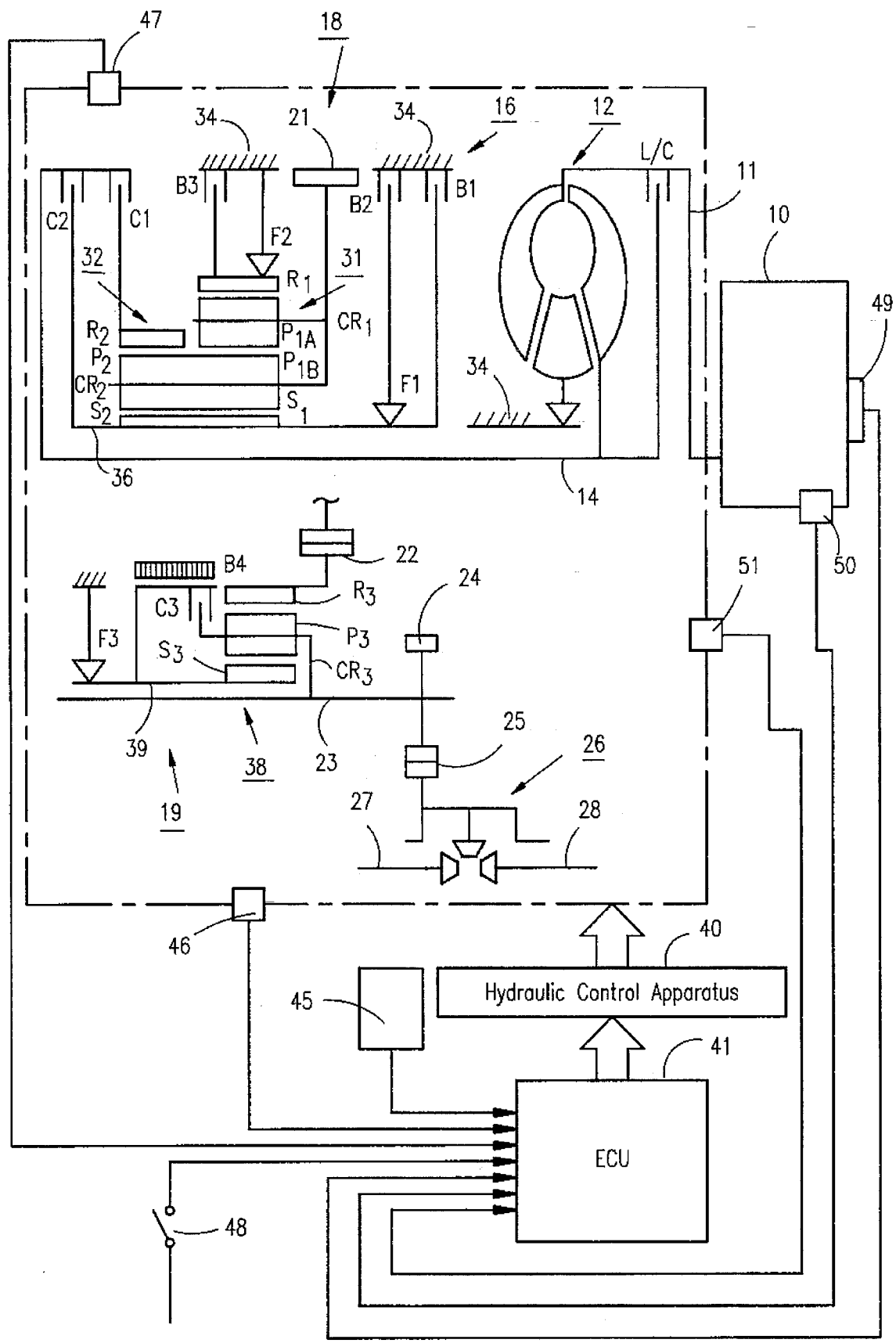
FIG. 2 is a schematic view of the automatic transmission.

Referring to FIG. 2, the rotation produced by the engine 10 is transmitted via an output shaft 11 to a torque convertor 12 constituting the fluid power transmission device 121 (FIG. 1). The torque convertor 12 transmits the rotation of the engine 10 through a fluid to an input shaft 14, but when the vehicle speed v exceeds a set value a lockup clutch L/C can be engaged and the rotation of the engine 10 thereby transmitted directly to the input shaft 14.

A gearbox 16 having four forward gears and one reverse gear is connected to the input shaft 14. The gearbox 16 comprises a main gearbox 18 having three forward gears and one reverse gear and an underdrive auxiliary gearbox 19. The rotation of the main gearbox 18 is transmitted via a counterdrive gear 21 and a counterdriven gear 22 to the auxiliary gearbox 19, and the rotation of the output shaft 23 of the auxiliary gearbox 19 is transmitted via an output gear 24 and a ring gear 25 to a differential 26.

In the differential 26, the rotation transmitted thereto via the output gear 24 is differentiated and the differentiated rotation is transmitted to driving wheels (not shown) in the drawings via left and right drive shafts 27 and 28.

The main gearbox 18 has a first planetary gear unit 31 and a second planetary gear unit 32 and also has first and second clutches C1 and C2, first, second and third brakes B1, B2 and B3, and first and second one-way clutches F1 and F2 for effecting selective transmission of torque between elements of the two planetary gear units 31 and 32. The first clutch C1 corresponds to the clutch C in FIG. 1.

The first planetary gear unit 31 is made up of a ring gear $R_1$ connected to a case 34 via the third brake B3 and the second one-way clutch F2, which are disposed in parallel with each other, a sun gear $S_1$ formed on a sun gear shaft 36 which, in turn, is mounted on the input shaft 14 for rotation relative thereto, a carrier $CR_1$ connected to the counterdrive gear 21, and pinions $P_{1A}$, $P_{1B}$ meshing with the ring gear $R_1$ and the sun gear $S_1$ and rotatably mounted on the carrier $CR_1$.

The sun gear shaft 36 is connected via the second clutch C2 to the input shaft 14. The sun gear shaft 36 is also connected to the case 34 (1) via the first brake B1 and (2) via the first one-way clutch F1 and the second brake B2, which are disposed in series with each other.

The second planetary gear unit 32 is made up of a ring gear $R_2$ connected via the first clutch C1 to the input shaft 14, a sun gear $S_2$ formed on the sun gear shaft 36 integrally with the sun gear $S_1$, a carrier $CR_2$ connected to the carrier $CR_1$, and a pinion $P_2$ formed integrally with the pinion $P_{1B}$ and rotatably mounted on the carrier $CR_2$ and meshing with the ring gear $R_2$ and the sun gear $S_2$.

The counterdrive gear 21 meshes with the counterdriven gear 22 in the auxiliary gearbox 19 and transmits the rotational output from the main gearbox 18 to the auxiliary gearbox 19.

The auxiliary gearbox 19 has a third planetary gear unit 38 and also has a third clutch C3, a fourth brake B4 and a third one-way clutch F3 for effecting selective transmission of torque between elements of the third planetary gear unit 38.

The third planetary gear unit 38 is made up of a ring gear $R_3$ connected to the counterdriven gear 22, a sun gear $S_3$ formed on a sun gear shaft 39 mounted on the output shaft 23 for rotation relative thereto, a carrier $CR_3$ fixed to the output shaft 23, and a pinion $P_3$ rotatably mounted on the carrier $CR_3$ and meshing with the ring gear $R_3$ and the sun gear $S_3$.

Next, the operation of this automatic transmission will be described with reference to FIG. 3.

In FIG. 3, S1 is a first solenoid valve, S2 is a second solenoid valve, S3 is a third solenoid valve, C1 is the first clutch, C2 is the second clutch, C3 is the third clutch, B1 is the first brake, B2 is the second brake, B3 is the third brake, B4 is the fourth brake, F1 is the first one-way clutch, F2 is the second one-way clutch and F3 is the third one-way clutch. R is the R range, N the N range, D the D range, 1ST the 1st gear, 2ND the 2nd gear, 3RD the 3rd gear and 4TH the 4th gear.

The O marks represent the ON state of the first solenoid valve S1, the second solenoid valve S2 and the third solenoid valve S3; the released state of the first clutch C1, the second clutch C2, the third clutch C3, the first brake B1, the second brake B2, the third brake B3 and the fourth brake B4; and the free state of the first one-way clutch F1, the second one-way clutch F2 and the third one-way clutch F3.

The x marks represent the OFF state of the first solenoid valve S1, the second solenoid valve S2 and the third solenoid valve S3; the released state of the first clutch C1, the second clutch C2, the third clutch C3, the first brake B1, the second brake B2, the third brake B3 and the fourth brake B4; and the free state of the first one-way clutch F1, the second one-way clutch F2 and the third one-way clutch F3.

A Δ mark indicates an element switched ON and OFF during the neutral control state, and an (O) mark indicates engagement during engine braking.

In the 1st gear of the D range, the first clutch C1 and the fourth brake B4 are engaged and the second one-way clutch F2 and the third one-way clutch F3 are locked. The rotation of the input shaft 14 is transmitted via the first clutch C1 to the ring gear $R_2$ and, because in this state the ring gear $R_1$ is prevented from rotating by the second one-way clutch F2, while the sun gear $S_2$ is caused to idly rotate, the rotation of the carrier $CR_2$ is greatly retarded and this rotation is transmitted to the counterdrive gear 21.

The rotation transmitted from the counterdrive gear 21 to the counterdriven gear 22 is transmitted to the ring gear $R_3$, but because rotation of the sun gear $S_3$ is prevented by the fourth brake B4, the rotation of the carrier $CR_3$ is further retarded and this rotation is transmitted to the output shaft 23.

In the 2nd gear of the D range, the first clutch C1, the first brake B1, the second brake B2 and the fourth brake B4 are engaged and the first one-way clutch F1 and the third one-way clutch F3 are locked. The rotation of the input shaft 14 is transmitted via the first clutch C1 to the ring gear $R_2$, and because rotation of the sun gear $S_2$ is prevented by the second brake B2 and the first one-way clutch F1, the rotation of the ring gear $R_2$ is retarded and transmitted to the carrier $CR_2$, and the rotation of the carrier $CR_2$ is transmitted to the counterdrive gear 21 while causing the ring gear $R_1$ to rotate idly.

The rotation transmitted from the counterdrive gear 21 to the counterdriven gear 22 is transmitted to the ring gear $R_3$, but because rotation of the sun gear $S_3$ is prevented by the fourth brake B4 the rotation of the carrier $CR_3$ is retarded and this rotation is transmitted to the output shaft 23.

In the 3rd gear of the D range, the first clutch C1, the third clutch C3, the first brake B1 and the second brake B2 are engaged and the first one-way clutch F1 is locked. The rotation of the input shaft 14 is transmitted via the first clutch C1 to the ring gear $R_2$, and because rotation of the sun gear $S_2$ is prevented by the second brake B2 and the first one-way clutch F1 the rotation of the ring gear $R_2$ is retarded and transmitted to the carrier $CR_2$, and the rotation of this carrier $CR_2$ is transmitted to the counterdrive gear 21 while causing the ring gear $R_1$ to rotate idly.

The rotation transmitted from the counterdrive gear 21 to the counterdriven gear 22 is transmitted to the ring gear $R_3$, but because relative rotation of the carrier $CR_3$ and the sun gear $S_3$ is prevented by the third clutch C3, the third planetary gear unit 38 is in a directly coupled state. As a result, the rotation of the counterdriven gear 22 is transmitted as is to the output shaft 23.

Next, in the 4th gear of the D range, the first clutch C1, the second clutch C2, the third clutch C3 and the second brake B2 are engaged. The rotation of the input shaft 14 is transmitted via the first clutch C1 to the ring gear $R_2$ and is transmitted via the second clutch C2 to the sun gear $S_2$, and the first and second planetary gear units 31 and 32 are in a directly coupled state. As a result, the rotation of the output shaft 11 is transmitted as is to the counterdrive gear 21.

The rotation transmitted from the counterdrive gear 21 to the counterdriven gear 22 is transmitted to the ring gear $R_3$, but because relative rotation of the carrier $CR_3$ and the sun gear $S_3$ is prevented by the third clutch C3, the third planetary gear unit 38 is in a directly coupled state. As a result, the rotation of the counterdriven gear 22 is transmitted as is to the output shaft 23.

This automatic transmission is provided with a hydraulic circuit (not shown) for engaging and disengaging the first clutch C1, the second clutch C2, the third clutch C3, the first brake B1, the second brake B2, the third brake B3 and the fourth brake B4, and this hydraulic circuit is controlled by hydraulic control circuit 40. The hydraulic control circuit 40 is connected to an automatic transmission control unit (ECU) 41, and the hydraulic control circuit 40 is controlled according to a control program of the automatic transmission control unit 41.

Connected to the automatic transmission control unit 41 are a neutral start switch (N.S.SW.) 45, an oil temperature sensor 46, a speed sensor 47, a brake switch 48, an engine speed sensor 49, a throttle angle sensor 50 and a vehicle speed sensor 51. The speed sensor 47 and the engine speed sensor 49 correspond respectively to the sensors 471 and 491 in FIG. 1.

The neutral start switch 45 detects the shift position of a shift lever (not shown), i.e. the selected range; the oil temperature sensor 46 detects the temperature of the oil in the hydraulic circuit; and the speed sensor 47 detects the speed of the input side of the first clutch C1, i.e. the speed of the input shaft 14, (hereinafter referred to as "the clutch input side speed") $N_{C1}$.

The brake switch 48 detects whether or not the brake pedal (not shown) is being depressed; the engine speed sensor 49 detects the engine speed $N_E$; the throttle angle sensor 50 detects the throttle angle θ; and the vehicle speed sensor 51 detects the vehicle speed v.

The hydraulic circuit will now be described.

Figure 4:
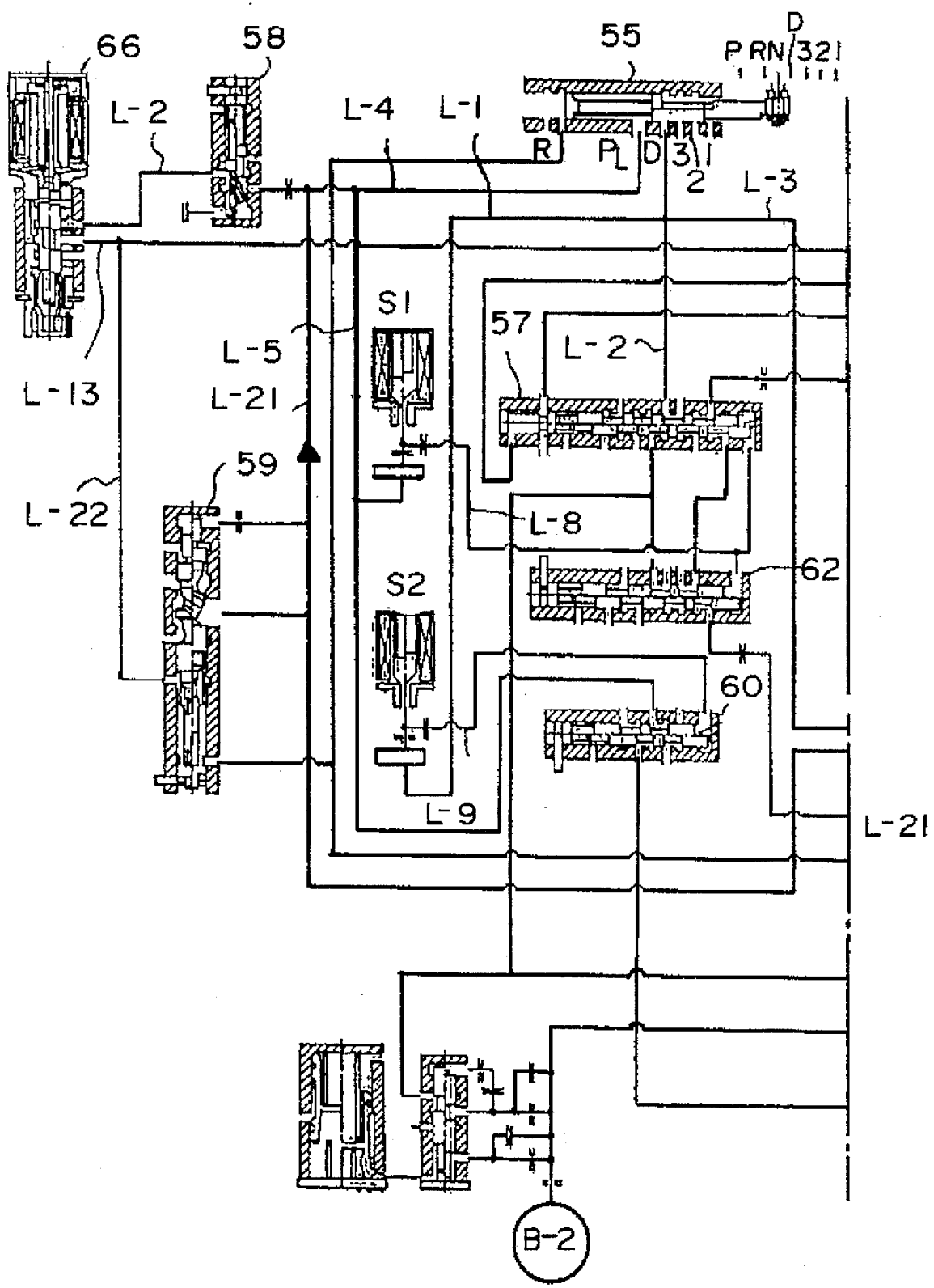
FIGS. 4 and 5 together show the hydraulic circuit of the automatic transmission.
Figure 5:
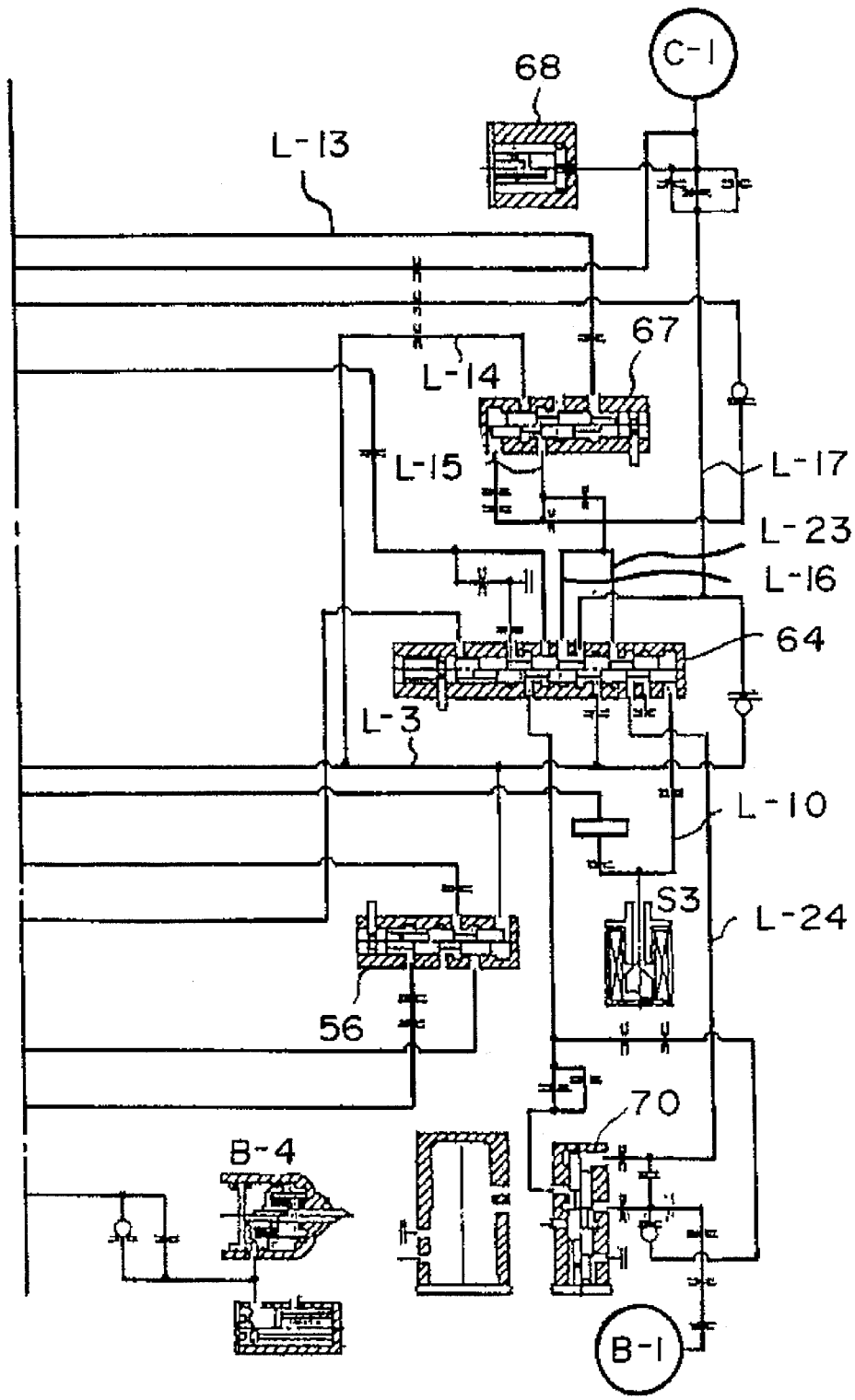

Referring to FIGS. 4 and 5, a primary valve 59 adjusts the hydraulic pressure from a hydraulic power source (not shown) and outputs it as a line pressure to an oil line L-21. A manual valve 55 has ports 1, 2, 3, D, $P_L$, R, and line pressure supplied to the port $P_L$ from the primary valve 59 via the oil lines L-21 and L-4 produces at the respective ports 1, 2, 3, D, R a 1st range pressure, a 2nd range pressure, a 3rd range pressure, a D range pressure and an R range pressure according to the position of the shift lever (not shown). The D range pressure produced at port D is supplied via an oil line L-1 to the second solenoid valve S2, via an oil line L-2 to a 1-2 shift valve 57, and via an oil line L-3 to a B-1 sequence valve 56.

The line pressure of the oil line L-21 is supplied to the third solenoid valve S3 and a solenoid modulator valve 58 and via an oil line L-5 to the first solenoid valve S1 and a 2-3 shift valve 60.

The first solenoid valve S1, the second solenoid valve S2 and the third solenoid valve S3 are switched ON and OFF by signals from the hydraulic control circuit 40 (FIG. 2); the first solenoid valve S1 supplies signal oil pressure via an oil line L-8 to the 1-2 shift valve 57 and a 3-4 shift valve 62, the second solenoid valve S2 supplies signal oil pressure via an oil line L-9 to the 2-3 shift valve 60, and the third solenoid valve S3 supplies signal oil pressure via an oil line L-10 to a neutral relay valve 64.

The spool of the 1-2 shift valve 57 takes the upper half position shown in FIG. 4 in the 1st gear and takes the lower half position in the 2nd, 3rd and 4th gears; the spool of the 2-3 shift valve 60 takes the lower half position shown in FIG. 4 in the 1st and 2nd gears and takes the upper half position in the 3rd and 4th gears; the spool of the 3-4 shift valve 62 takes the upper half position shown in FIG. 4 in the 1st and 4th gears and takes the lower half position in the 2nd and 3rd gears; and the spool of the neutral relay valve 64 takes the upper half position shown in FIG. 5 in the artificial neutral state and takes the lower half position in the 1st to 4th gears.

The solenoid modulator valve 58 is connected via an oil line L-12 to a linear solenoid valve 66, and the linear solenoid valve 66 is connected via an oil line L-13 to a C-1 control valve 67. Also, the linear solenoid valve 66 is connected via an oil line L-22 to the primary valve 59.

The linear solenoid valve 66 is controlled by signals from the hydraulic control circuit 40 and supplies a throttle pressure $P_{TH}$ as a control pressure to the C-1 control valve 67. The D range pressure is supplied to the C-1 control valve 67 via the oil lines L-3 and L-14, and the C-1 control valve 67 adjusts the D range pressure which it receives to a hydraulic servo C-1 oil pressure (hereinafter referred to as "the C-1 oil pressure") $P_{C1}$ corresponding to the throttle pressure $P_{TH}$ from the linear solenoid valve 66 and supplies it to an oil line L-15.

The spool of the neutral relay valve 64 takes the upper half position shown in FIG. 5 in the artificial neutral state. As a result, in the artificial neutral state, the C-1 oil pressure $P_{C1}$ produced in the oil ling L-15 is supplied via an oil line L-16, the neutral relay valve 64 and an oil line L-17 to the hydraulic servo C-1. Also, oil at the C-1 oil pressure $P_{C1}$ is supplied via oil lines L-23 and L-24 to a B-1 control valve 70.

The neutral relay valve 64 normally assumes the lower half position in the 1st to 4th gears. As a result, in the 1st to 4th gears oil at the D range pressure is supplied via the oil line L-3, the neutral relay valve 64 and the oil line L-17 to the hydraulic servo C-1. In the neutral control state, the neutral relay valve 64 is changed over to the upper half position and the oil line L-16 and the oil line L-17 are thereby connected.

The reference number 68 denotes a damper valve disposed in the oil line L-17 for absorbing pulses of the C-1 oil pressure $P_{C1}$; B-1 denotes a first brake B1 hydraulic servo, B-2 denotes a second brake B2 hydraulic servo, and B-4 denotes a fourth brake B4 hydraulic servo.

Next, the operation of the transmission in the neutral control state will be described.

In the conventional technology, the oil pressure of the hydraulic servo C-1 is set and feedback control thereof is carried out so that the input-output speed differential is maintained at a predetermined value necessary for preventing the occurrence of the creep phenomenon; however, there is almost no difference in this predetermined value between the state wherein the clutch piston of the first clutch C1 has not advanced at all and the stroke is "O" and the state wherein the first clutch C1 is just about to be engaged. As a result, it is necessary to so set the predetermined value that the clutch engages with slipping.

In contrast to this, in the automatic transmission control apparatus of this invention, it is judged whether or not the vehicle is at a standstill and, when the vehicle is judged at a standstill, the first clutch C1 is gradually released, and during this time the control apparatus detects the engine speed $N_E$ and the clutch input side speed $N_{C1}$ and waits for them both to stabilize.

When the engine speed $N_E$ and the input side speed $N_{C1}$ stabilize, because this means that the first clutch C1 has been released, the throttle pressure $P_{TH}$ supplied from the linear solenoid valve 66 is controlled and the C-1 oil pressure $P_{C1}$ is increased a little at a time whereby the first clutch C1 is gradually engaged.

The state of engagement of the first clutch C1 is detected as the amount of change in the differential speed $\Delta N$ between the engine speed $N_E$ and the clutch input side speed $N_{C1}$, and when there is no change in the differential speed $\Delta N$, i.e. when the first clutch C1 has been released, the C-1 oil pressure $P_{C1}$ is increased and the first clutch C1 is thereby engaged. When there is change in the differential speed $\Delta N$, i.e. when slipping engagement of the first clutch C1 has started, the C-1 oil pressure $P_{C1}$ is reduced and the first clutch C1 is thereby released.

By this operation being repeated, the hydraulic servo C-1 of the first clutch C1 avoids stroke loss in the first clutch C1 and maintains the first clutch C1 in preparation for slipping engagement.

As a result, the occurrence of engagement delay, engine racing and engagement shock due to stroke loss of the first clutch piston, when in the neutral control state the accelerator pedal is depressed and the first clutch is reengaged, can be prevented.

Because in the neutral control state there is no slipping engagement of the clutch, the vehicle is not subjected to idling vibration and the savings in fuel consumption due to the neutral control state is maintained. Furthermore, there is no heating of the frictional material of the first clutch C1 or consequent deterioration of the frictional material.

Normally, when the oil pressure supplied to the hydraulic servo C-1 is changed, a time lag occurs between issuance of a signal for the throttle pressure $P_{TH}$ from the hydraulic control circuit 40 (FIG. 2), to the linear solenoid valve 66 and establishment of $P_{TH}$ as the actual oil pressure in the hydraulic servo C-1; however, in this preferred embodiment, because the automatic transmission control unit 41 judges the amount of change in the differential speed $\Delta N$ at intervals of a predetermined time, the throttle pressure $P_{TH}$ is not mistakenly further changed during this lag time.

Although when the idling speed of the engine changes the input side speed of the torque convertor 12 likewise changes, the output side speed of the torque convertor 12 also changes correspondingly. As a result, when a change in the differential speed $\Delta N$ is detected, the first clutch C1 is not mistakenly taken as being engaged when there has been a change in the idling speed.

Figure 6:
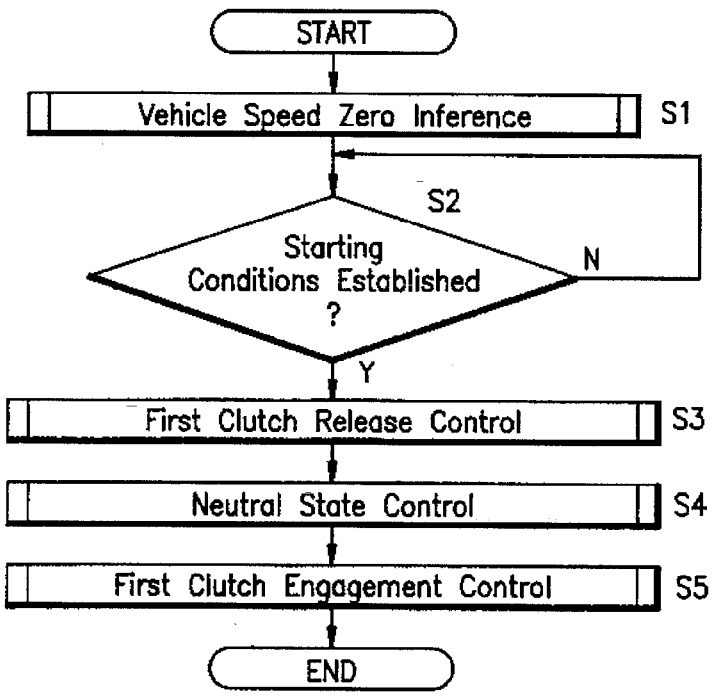
FIG. 6 is a flow chart of the main control routine for operation of the automatic transmission control apparatus.

Referring to FIG. 6, in step S1 a vehicle speed of zero is inferred based on the amount of change in the clutch input side speed $N_{C1}$.

In step S2, when the accelerator pedal (not shown) is released, when the brake pedal (not shown) is depressed and when the vehicle comes to a standstill, processing of the routine waits for the neutral control state starting conditions to be established. When these starting conditions are established, processing proceeds to step S3.

Here, the starting conditions are judged to be established when (1) a vehicle speed v of zero is no longer inferred, when (2) the throttle angle θ is below a predetermined value, when (3) the oil temperature detected by the oil temperature sensor 46 is above a predetermined value, and when (4) the brake switch 48 is ON.

In step S3, first clutch C1 release control processing is carried out by initial pressure reducing means. Here, the C-1 oil pressure $P_{C1}$ is brought to the throttle pressure $P_{TH}$ which is set based on the engine speed $N_E$, $N_E$ corresponding to the input torque. To effect this, the C-1 oil pressure $P_{C1}$ is reduced in increments of a first set pressure.

In step S4, neutral state control processing is carried out. Here, the processing routine waits for the engine speed $N_E$ and the input side speed $N_{C1}$ to stabilize and, when they have stabilized, controls the C-1 oil pressure $P_{C1}$ by increasing it in increments of a second set pressure and reducing it in increments of a third set pressure, based on the engine speed $N_E$ and the clutch input side speed $N_{C1}$.

In step S5, first clutch engagement control processing is carried out. Here, the C-1 oil pressure $P_{C1}$ is raised in increments of a fourth set pressure. The fourth set pressure is based on variables such as the throttle angle θ and the engine speed $N_E$ and thereby completes the piston stroke of the hydraulic servo C1 (FIG. 5). When the piston stroke of the hydraulic servo C1 is completed, the C-1 oil pressure $P_{C1}$ is increased in increments of a fifth set pressure and the occurrence of engagement shock is thereby prevented.

Figure 7:
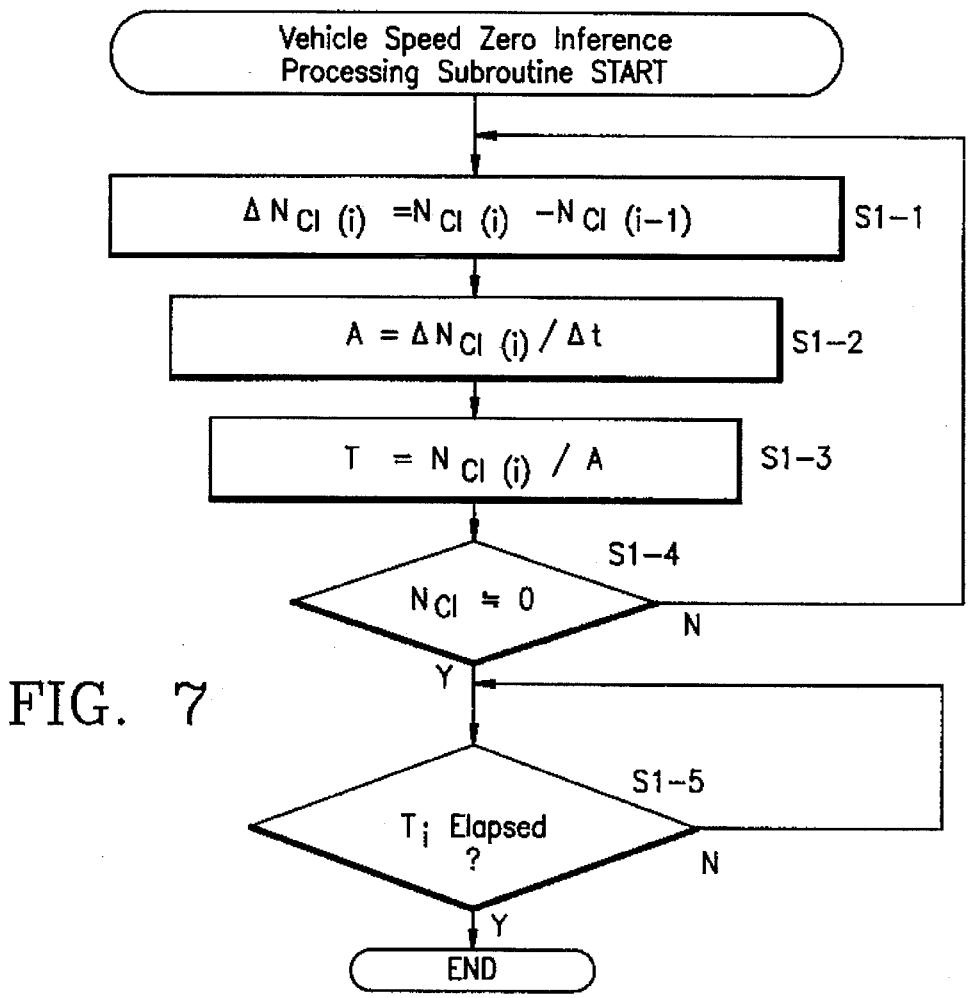
FIG. 7 is a flow chart of a subroutine for step S1 in FIG. 6.
Figure 8:
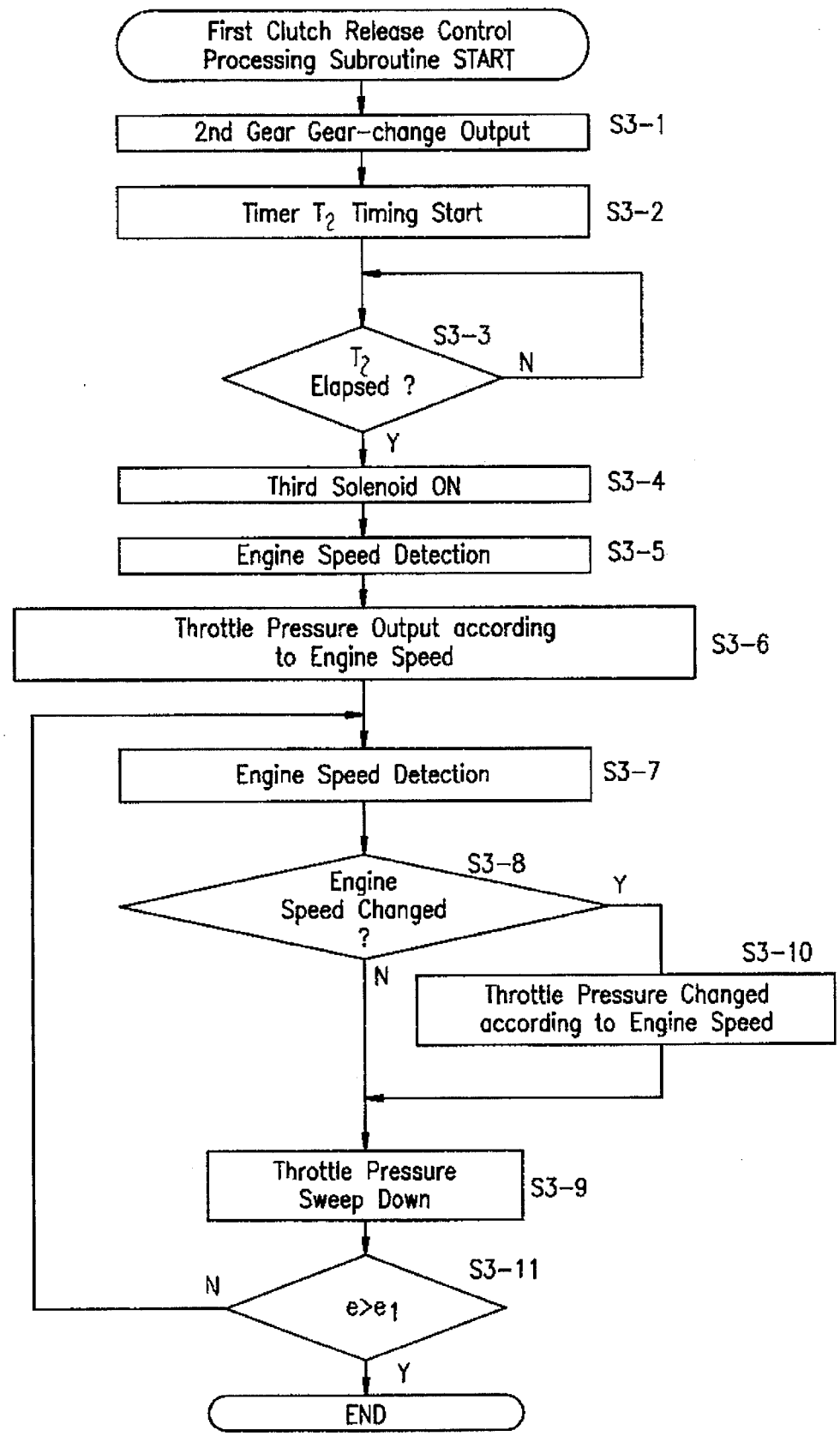
FIG. 8 is a flow chart of a subroutine for step S3 in FIG. 6.
Figure 9:
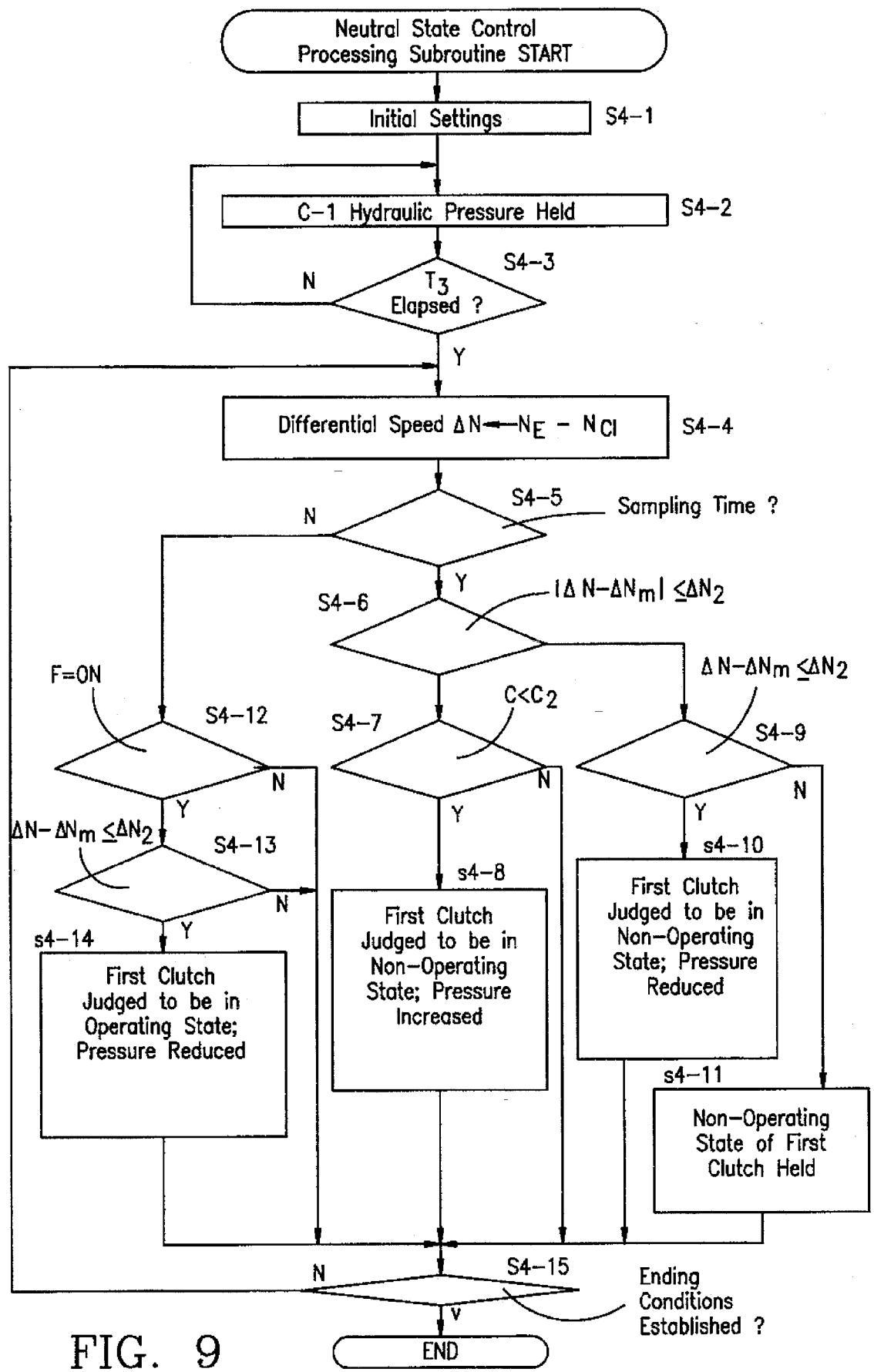
FIG. 9 is a flow chart of a subroutine for step S4 in FIG. 6.
Figure 10:
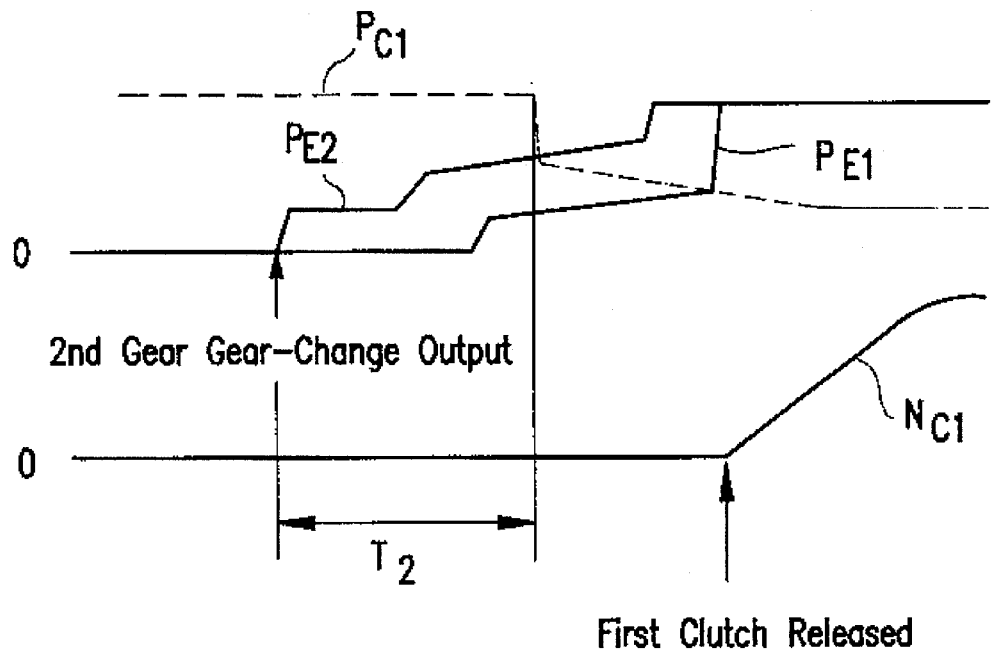
FIG. 10 is a time chart for a 2nd gear gear-change.

Next, the vehicle speed zero inference processing subroutine of step S1 of FIG. 6 will be described with reference to FIG. 7 wherein:

In step S1-1, the speed differential $\Delta N_{C1(i)}$ is calculated by subtracting the clutch input side speed $N_{C1(i-1)}$ at time Δt ago from the present clutch input side speed $N_{C1(i)}$. Here, the time Δt is set by a clock inside the automatic transmission control unit 41 (FIG. 2), and the clutch input side speed $N_{C1}$ is detected at intervals of time Δt.

In step S1-2, the deceleration A of the vehicle is calculated by dividing the speed differential $\Delta N_{C1(i)}$ by the time Δt.

In step S1-3, the time $T_1$ for the vehicle to come to a standstill is calculated by dividing the present clutch input side speed $N_{C1(i)}$ by the deceleration A.

In step S1-4, processing waits for the present clutch input side speed $N_{C1(i)}$ to become too low to be measured. When this happens, processing proceeds to step S1-5; when this does not happen, processing returns to step S1-1.

In step S1-5 processing waits for the time $T_1$, timed by a timer (not shown) to elapse and, when the time $T_1$ elapses, infers that the vehicle speed v has become-zero.

Next, the first clutch release control processing subroutine of step S3 of FIG. 6 will be described, with reference to FIG. 8 to FIG. 11.

In step S3-1, after the starting conditions are established, a 2nd gear gear-change output is generated and the first brake B1 (FIG. 2) is engaged for hill-holding.

In step S3-2, timing of a time $T_2$ by a timer (not shown) is started.

In step S3-3, by waiting for the time $T_2$ to elapse, the processing routine waits for the first brake B1 to engage. The value of the time $T_2$ is set with due consideration given to the time lag in the reduction of the oil pressure of the hydraulic servo C-1 (FIG. 5) and the time lag for the first brake B1 to become engaged. Because the first brake B1 is engaged before the first clutch C1 is released, the occurrence of shock accompanying the gear-change can be prevented and entry into the neutral control state can be accomplished smoothly.

In step S3-4, the signal $S_3$ supplied to the third solenoid valve S3 is switched ON, the spool of neutral relay valve 64 is changed over to the upper half position shown in FIG. 5 and the C-1 oil pressure $P_{C1}$ is thereby rendered controllable.

In step S3-5, the engine speed $N_E$ corresponding to the input torque is detected, and $N_E$ is set as a reference engine speed $N_{Em}$.

Figure 11:
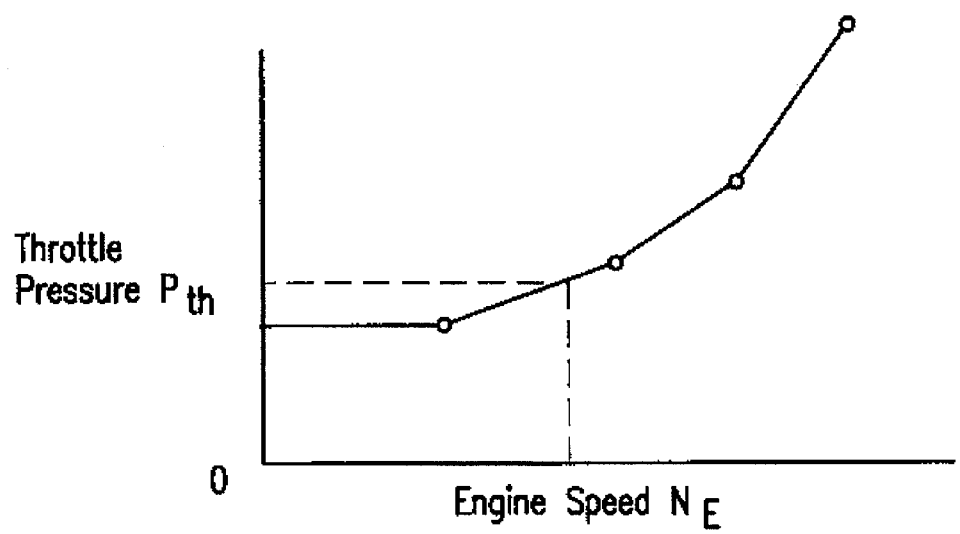
FIG. 11 is a graph showing a relationship between engine speed $N_E$ (horizontal axis) and throttle pressure $P_{TH}$ (vertical axis)

In step S3-6, based on the relationship shown in FIG. 11, the throttle pressure $P_{TH}$ is reduced and the C-1 oil pressure $P_{C1}$ is thereby reduced according to the engine speed $N_E$ to a value where the first clutch C1 is just about to start slippingly engagement.

In step S3-7, the engine speed $N_E$ corresponding to the input torque is again detected.

In step S3-8, a determination is made whether or not the engine speed $N_E$ has deviated from the reference engine speed $N_{Em}$. When it has not deviated, processing proceeds to step S3-9, and when it has deviated processing proceeds to step S3-10.

In step S3-9 the throttle pressure $P_{TH}$, i.e. the C-1 oil pressure $P_{C1}$, is reduced (swept down) in increments of the first set pressure ΔP at intervals of a time Δt corresponding to the engine speed $N_E$.

In step S3-10, the time Δt and the first set pressure ΔP are changed to correspond to the reference engine speed $N_{Em}$. The throttle pressure $P_{TH}$ corresponding to the engine speed $N_E$ at this point in time is obtained from the relationship graph of FIG. 11, and when the throttle pressure $P_{TH}$ is lower than the C-1 oil pressure $P_{C1}$ at that point in time, the setting of the throttle pressure $P_{TH}$ is changed. The engine speed $N_E$ is set as the reference engine speed $N_{Em}$ at this point in time.

In step S3-11, after the first clutch C1 has started to slip, releasing judging means waits for the first clutch C1 to be released, i.e. until the speed ratio $e=N_{C1}/N_E$ becomes larger than a constant $e_1$. When the speed ratio e becomes larger than the constant $e_1$, the pressure reduction of step S3-9 is stopped. The constant $e_1$, with due consideration of delay in the change in engine speed $N_E$ when the first clutch C1 is released, is set for example at 0.75. The clutch input side speed $N_{C1}$ may be used instead of the speed ratio e.

When the engaged state of the first clutch C1 is detected as a change in the differential speed ΔN, for example, a determination of the engaged state will be made both when the first clutch C1 is completely engaged (a correct determination) and when it is released (an incorrect determination), because in both cases the differential speed ΔN does not change. Consequently, it is difficult to distinguish between when the first clutch C1 is completely engaged and when it is released.

However, by waiting for the speed ratio e to become larger than the constant $e_1$ the first clutch C1 can be reliably brought to the point where slipping engagement is about to start.

Next, the neutral state control processing subroutine of step S4 of FIG. 6 will be described with reference to FIG. 9 to FIG. 13.

In step S4-1 (FIG. 9), setting means sets initial values of a flag F, a count value C of a counter (not shown) in the drawings, and a reference differential speed $\Delta N_m$ as follows:

F ←OFF

C ←0

$\Delta N_m$ ←the value of ΔN at that point in time ($N_E - N_{C1}$)

In steps S4-2 and S4-3, the C-1 oil pressure $P_{C1}$ is held at the final value which it had at the end of the first clutch release control process. When judgment of whether or not the differential speed ΔN has changed is started immediately after it is confirmed that the first clutch C1 has been released to a predetermined extent, there is the possibility of a misjudgment caused by a change in the differential speed ΔN resulting from pressure reduction taking place during the first clutch release control process. To avoid this, delaying means inclusive of a timer (not shown) continues the holding of the C-1 oil pressure $P_{C1}$ until a time $T_3$ has elapsed. In this way, the judgment of whether or not the differential speed $\Delta N$ has changed is delayed, and the C-1 oil pressure $P_{C1}$ is prevented from being adjusted while the first clutch C1 is in an unstable state immediately after being released.

"Unstable state", as used herein has reference to the fact that as the pressure $P_{C1}$ drops during release of clutch C1, $\Delta N$ necessarily changes. Therefore, the aforementioned delay avoids use, as a control parameter, of that $\Delta N$ which occurs as a result of pressure change associated with change in state of the clutch C1.

In step S4-4, differential speed calculating means calculates the differential speed $\Delta N$ between the engine speed $N_E$ and the clutch input side speed $N_{C1}$.

In step S4-5, a determination is made as to whether or not a preset sampling time has been reached, for example, whether or not 1.0 sec or 0.5 secs has elapsed. When the sampling time has been reached processing proceeds to step S4-6, and when the sampling time has not been reached processing proceeds to step S4-12.

Figure 12:
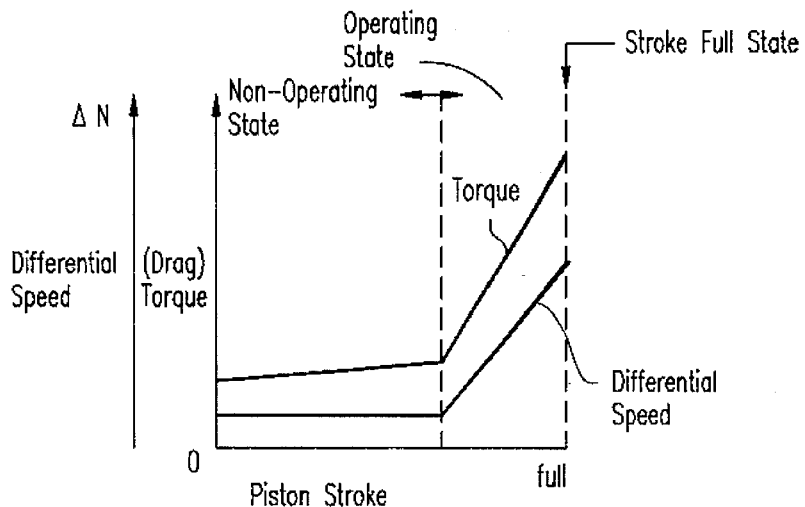
FIG. 12 is a graph of differential speed ΔN or "drag torque" (vertical axis) versus piston stroke of the first clutch (horizontal axis) in the neutral control state of a preferred embodiment.

In step S4-6 it is judged whether or not the absolute value of the difference between the differential speed $\Delta N$ and the reference differential speed $\Delta N_m$ is below a set value $\Delta N_R$, i.e. whether or not the amount of change in the differential speed $\Delta N$ is below the set value $\Delta N_R$. When it is below the set value $\Delta N_R$ processing proceeds to step S4-7, and when it is not processing proceeds to step S4-9. The set value $\Delta N_R$ is preset to discriminate between the operating state and the non-operating state of the first clutch C1, as shown in FIG. 12.

When the differential speed $\Delta N$ is calculated, if the signal from the input side speed sensor 491 (FIG. 1) or that from the output side speed sensor 471 is erroneous or if an error is made in calculation, there is the possibility of an incorrect judgement that the differential speed $\Delta N$ has changed. To avoid this, the control system of the present invention relies on the fact that the differential speed $\Delta N$ changes suddenly when the first clutch C1 moves from a position just about to engage to the position initiating engagement; by the differential speed $\Delta N$ being judged to have changed when the amount of change in the differential speed $\Delta N$ is greater than the set value $\Delta N_R$, the above-described misjudgment of change in the differential speed $\Delta N$ can be prevented.

If the value $\Delta N_R$ is set in accordance with the temperature of the oil, the C-1 oil pressure $P_{C1}$ can be well controlled regardless of whether the oil is cold or hot.

In step S4-7 a determination is made as to whether or not the count value C of the counter is smaller than a set value $C_R$. When it is smaller than the set value $C_R$ processing proceeds to step 4-8, and when it is larger than the set value $C_R$ processing proceeds to step S4-15.

Figure 13:
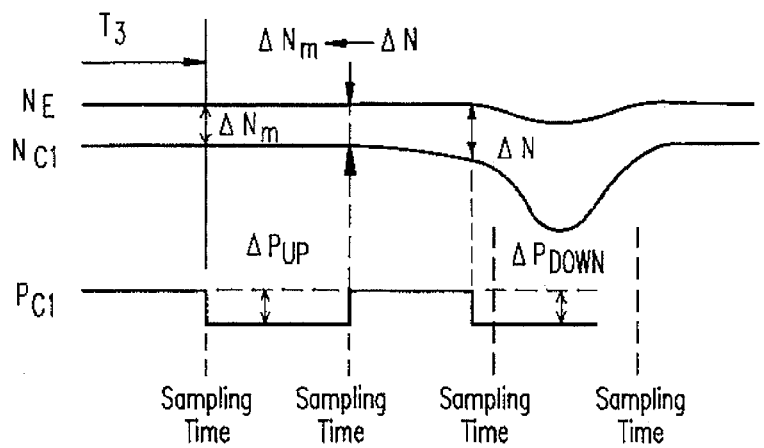
FIG. 13 is a time chart of engine speed, clutch input side speed and C-1 oil pressure in the neutral control state of a preferred embodiment.

In step S4-8, because there is no change in the differential speed $\Delta N$, it is judged that the first clutch C1 is in the non-operating state. In this state, because it is possible that the clutch piston has returned too far, the pressure increasing means raises the C-1 oil pressure $P_{C1}$ by a second set pressure $\Delta P_{UP}$ as shown in FIG. 13.

$$P_{C1} \leftarrow P_{C1} + \Delta P_{UP}$$

Also, the differential speed $\Delta N$ is set as the reference differential speed $\Delta N_m$ and the flag F is changed to ON.

$$\Delta N_m \leftarrow \Delta N$$

$$F \leftarrow ON$$

In step S4-9 it is judged whether or not the amount of change in the differential speed $\Delta N$ is tending to decrease, i.e. whether or not the remainder when the reference differential speed $\Delta N_m$ is subtracted from the differential speed $\Delta N$ is below the set value $\Delta N_R$. When it is below the set value $\Delta N_R$ processing proceeds to step S4-11, and when it is greater than the set value $\Delta N_R$ processing proceeds to step S4-10.

In step S4-10, upon judgement that the first clutch C1 is shifting from the non-operating state to the operating state, the pressure reducing means reduces the C-1 oil pressure $P_{C1}$ by the third set pressure $\Delta P_{DOWN}$.

$$P_{C1} \leftarrow P_{C1} - \Delta P_{DOWN}$$

Also, the differential pressure $\Delta N$ is assigned as the reference differential speed $\Delta N_m$, the flag F is changed to OFF, and '1' is subtracted from the count value of the counter. The C-1 oil pressure $P_{C1}$ at this point in time is assigned as a reference C-1 oil pressure $P_{C1m}$.

$$\Delta N_m \leftarrow \Delta N$$

$$F \leftarrow OFF$$

$$C \leftarrow C-1 \text{ (however, when C<0 results, C is set to 0)}$$

$$P_{C1m} \leftarrow P_{C1}$$

In step S4-11, upon judgement that the first clutch C1 is shifting from the operating state to the nonoperating state, the C-1 oil pressure $P_{C1}$ is held at its value as of that point in time and the flag F is changed to OFF.

$$F \leftarrow OFF$$

That is, when the first clutch C1 is shifting from the operating state to the non-operating state, the differential speed $\Delta N$ decreases. At this time, if the C-1 oil pressure $P_{C1}$ is further reduced, there is the possibility of the clutch piston suddenly retracting, resulting in an excessive stroke loss. To avoid this stroke loss, when the first clutch C1 is shifting from the operating state to the non-operating state, reduction of the C-1 oil pressure $P_{C1}$ is temporarily halted and it is held at its value as of that point in time.

In step S4-12 it is judged whether or not the flag F is ON, i.e. whether or not the C-1 oil pressure $P_{C1}$ was increased at the time of the previous sampling. When the flag F is ON processing proceeds to step S4-13, and when the flag F is OFF processing proceeds to step S4-15.

In step S4-13, because the C-1 oil pressure $P_{C1}$ was increased at the time of the previous sampling, it is judged whether or not the remainder when the reference differential speed $\Delta N_m$ is subtracted from the differential speed $\Delta N$ is below the set value $\Delta N_R$. When it is below the set value $\Delta N_R$ processing proceeds to step S4-14, and when it is greater than the set value $\Delta N_R$ processing proceeds to step S4-15.

In step S4-14, because the C-1 oil pressure $P_{C1}$ was increased at the time of the previous sampling, the differential speed $\Delta N$ has changed. As a result, it is judged that the first clutch C1 is in the engaged state and the pressure reducing means reduces the C-1 oil pressure $P_{C1}$ by the third set pressure $\Delta P_{DOWN}$.

$$P_{C1} \leftarrow P_{C1} - \Delta P_{DOWN}$$

Also, the differential speed $\Delta N$ is assigned as the reference differential speed $\Delta N_m$, the flag F is changed to OFF and '1' is added to the count value of the counter. As in step S4-10, the C-1 oil pressure $P_{C1}$ as of this point in time is assigned as the reference C-1 oil pressure $P_{C1m}$.

ΔN←ΔN

F←OFF

C←C+1

$P_{C1m} \leftarrow P_{C1}$

As mentioned above, at each sampling it is judged whether or not the differential speed ΔN has changed; however, when as a result of that judgment the C-1 oil pressure $P_{C1}$ is raised and engagement of the first clutch C1 is immediately started and the first clutch C1 enters the slipping engagement state, it sometimes happens that the transmission of torque begins and idling vibration occurs. To avoid this, when the differential speed ΔN has increased when the first clutch C1 has started to engage, the C-1 oil pressure $P_{C1}$ is reduced without waiting for the next sampling time. In this way the first clutch C1 is prevented from entering the slipping engagement state and the occurrence of idling vibration is prevented.

Also, as described above, at the time of sampling the C-1 oil pressure $P_{C1}$ is only changed when the amount of change in the differential speed ΔN is greater than the set value $\Delta N_R$. Here, for example, if the differential speed ΔN changes only by a very small amount each time, it sometimes happens that the C-1 oil pressure $P_{C1}$ is not changed even though the first clutch C1 is shifting to the engaged state. To avoid this, the reference differential speed $\Delta N_m$ is updated only when the C-1 oil pressure $P_{C1}$ has been changed, if the differential speed ΔN is changing only by a very small amount each time and the first clutch C1 is shifting into the engaged state and, thus, the C-1 oil pressure $P_{C1}$ can be reliably changed.

In step S4-15 it is judged whether or not the conditions for ending the neutral state of the first clutch C1 have been established. When the ending conditions have been established the neutral state control processing is ended, and when the ending conditions have not been established processing returns to step S4-4 and the above processing is repeated.

Figure 14:
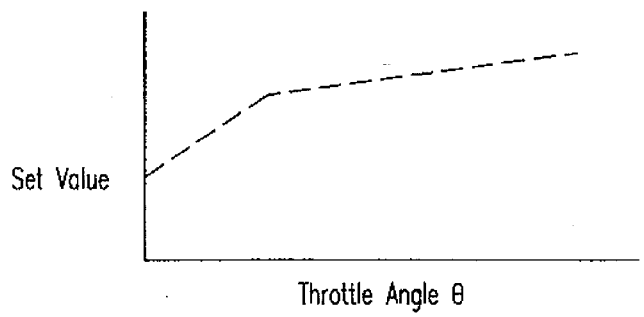
FIG. 14 is a graph of throttle angle θ (horizontal axis) versus the set value (vertical axis)
Figure 15:
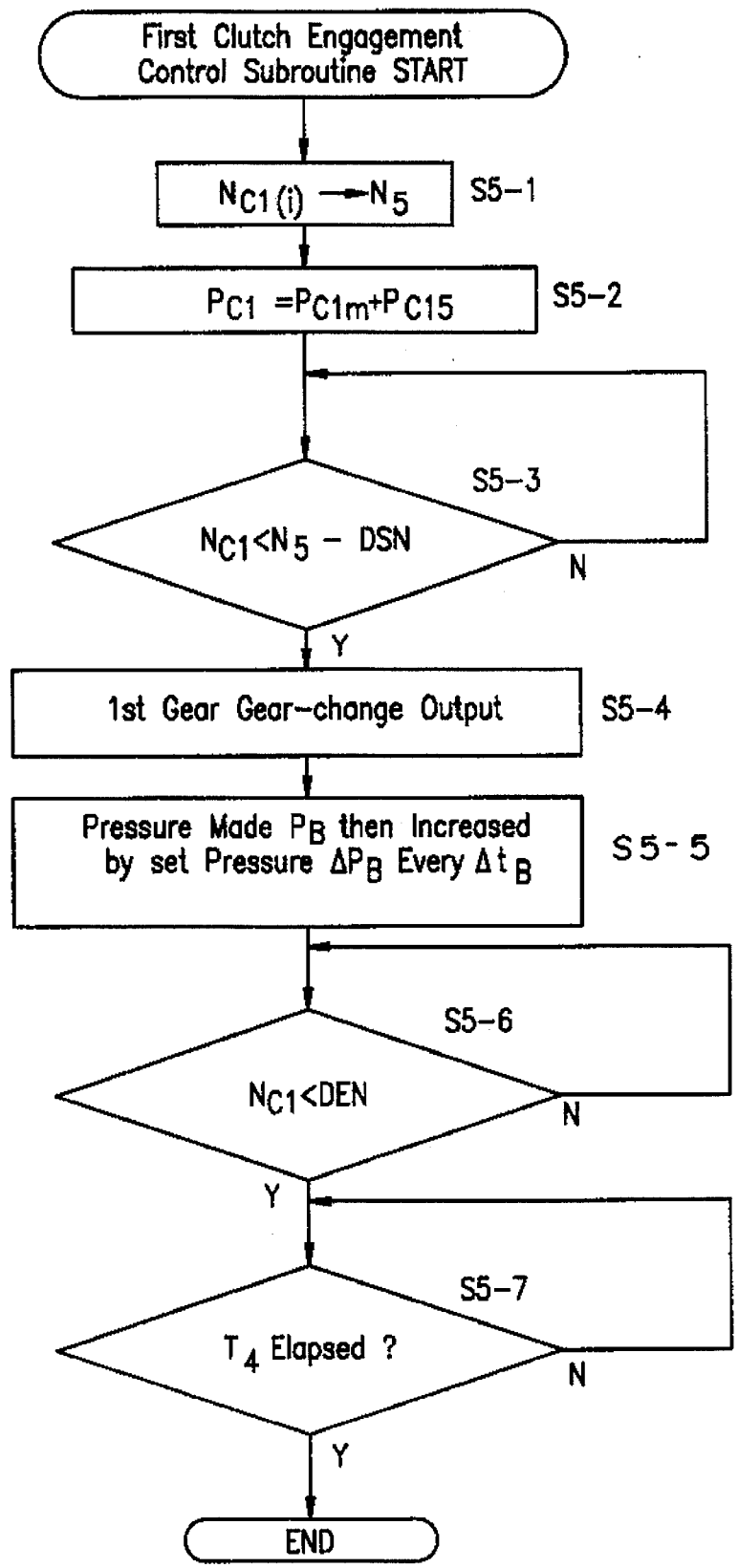
FIG. 15 is a flow chart of a subroutine for step S5 in FIG. 6.
Figure 16:
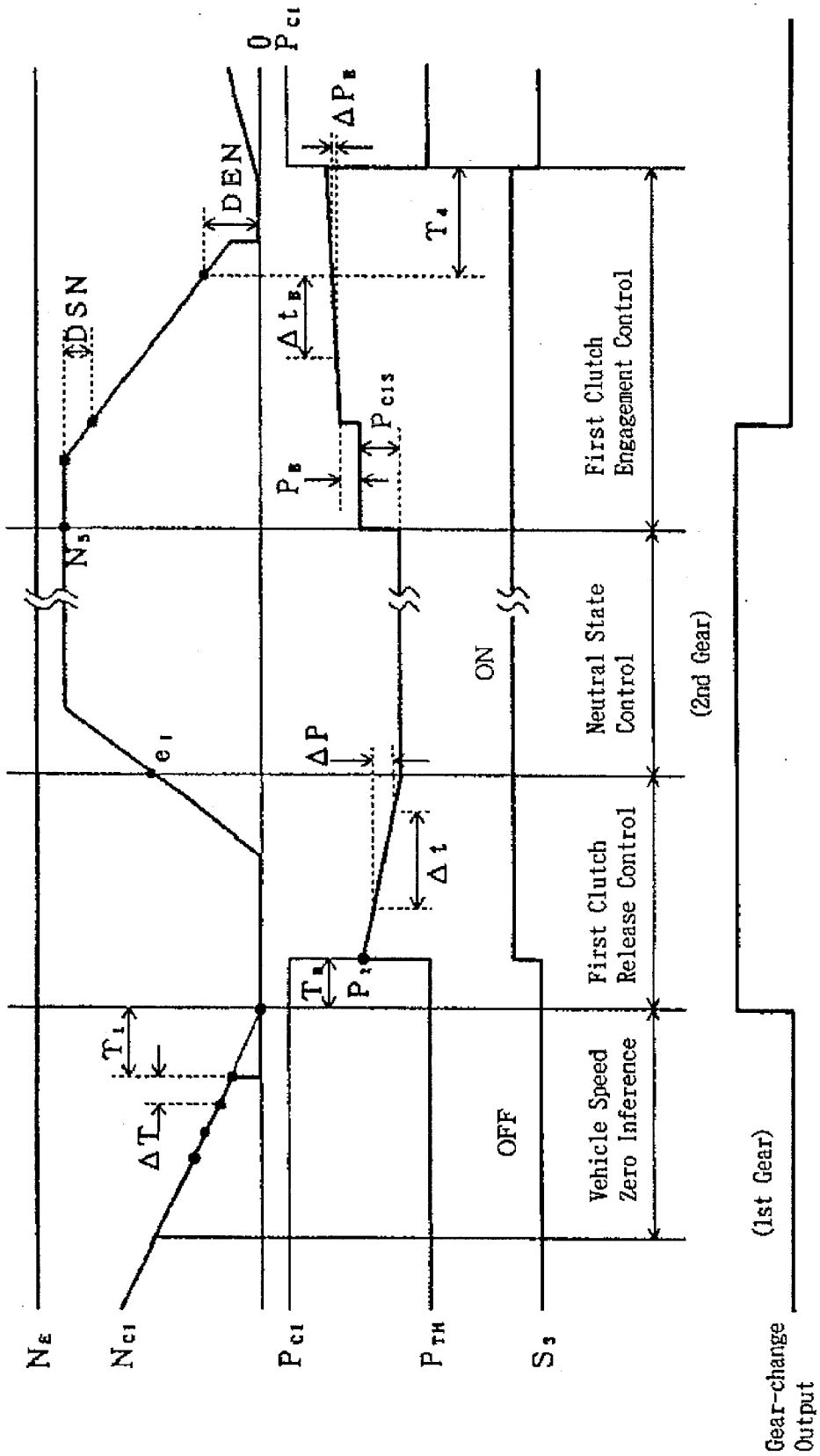
FIG. 16 is a time chart of the automatic transmission control apparatus.

Next, the first clutch engagement control processing subroutine of step S5 in FIG. 6 will be described with reference to FIG. 14 and FIG. 15.

In step S5-1, the clutch input side speed $N_{C1}$ as of the point in time at which the conditions for ending neutral state control were established is stored as a value $N_S$ in a memory (not shown) inside the automatic transmission control unit 41 (FIG. 2).

In step S5-2, a constant $P_{C1S}$ is added to the reference C-1 oil pressure $P_{C1m}$ set in steps S4-10 and S4-11, and the value thus obtained is assigned as the C-1 oil pressure $P_{C1}$. The constant $P_{C1S}$ is set at a value such that the piston (not shown in the drawings) of the hydraulic servo C-1 (FIG. 5) can be moved through its stroke and also such that engagement shock is reduced.

In step S5-3 processing waits for the clutch input side speed $N_{C1}$ to become smaller than the value obtained by subtracting a constant DSN from the value $N_S$, and when the clutch input side speed $N_{C1}$ becomes smaller than the value obtained by subtracting the constant DSN from the value $N_S$ it is judged that the first clutch C1 has started to engage and processing proceeds to step S5-4.

In step S5-4 the 1st gear gear-change output is produced.

In step S5-5 the throttle pressure $P_{TH}$ from the linear solenoid valve 66 (FIG. 4) is changed, the C-1 oil pressure $P_{C1}$ is increased to the pressure $P_B$, and then, every time a time $\Delta t_B$ elapses, the C-1 oil pressure $P_{C1}$ is raised by a fourth set pressure $\Delta P_B$ and engagement of the first clutch C1 is continued.

In step S5-6 processing waits for the clutch input side speed $N_{C1}$ to become smaller than a constant DEN.

In step S5-7 processing, with a timer (not shown), waits for a time T4 to elapse.

Here, set values such as the constant $P_{C1S}$, the pressure $P_B$ and the fourth set pressure $\Delta P_B$ are set based on variables such as the throttle angle θ which corresponds to the input torque $T_T$.

The invention may be embodied in other specific forms without departing from its spirit or essential characteristics. The present embodiments are, therefore, to be considered in all respects as illustrative and not restrictive, the scope of the invention being indicated by the claims rather than by the foregoing description, and all changes which come within the meaning and range of the equivalents of the claims are therefore intended to be embraced therein.

What is claimed is:

1. An automatic transmission control system for controlling a transmission gearbox in a drivetrain including an engine and a fluid power transmission device transmitting the rotation of the engine to the transmission gearbox, to create a neutral control state when a forward travel range is selected and the vehicle is at a standstill with the engine idling, said control system comprising:

a clutch within the transmission gearbox which is engaged when a forward travel range is selected;

a hydraulic servo for engaging the clutch responsive to oil pressure;

an input side speed sensor for detecting input side speed of the fluid power transmission device;

an output side speed sensor for detecting output side speed of the fluid power transmission device; and a control device for controlling the oil pressure to the hydraulic servo, said control device comprising:

differential speed calculating means for calculating a differential speed as the difference between the detected input side speed and the detected output side speed of the fluid power transmission device;

differential speed change judging means for repeatedly judging, at intervals of a set time, whether or not the differential speed calculated by the differential speed calculating means has changed;

pressure increasing means for increasing the oil pressure to the hydraulic servo by a predetermined amount of pressure when the differential speed has not changed; and pressure reducing means for reducing the oil pressure to the hydraulic servo by a set pressure when the differential speed has changed.

2. An automatic transmission control apparatus according to claim 1, wherein:

the differential speed change judging means judges the differential speed to have changed when the differential in speed has changed by an amount greater than a set value.

3. An automatic transmission control apparatus according to claim 1, wherein:

the differential speed judging means further judges whether or not the change in differential speed is a decrease, and when the differential speed is decreasing the oil pressure of the hydraulic servo is held at its value as of that time.

4. An automatic transmission control apparatus according to claim 2, wherein:

the differential speed judging means further judges whether or not the change in differential speed is a decrease, and when the differential speed is decreasing the oil pressure of the hydraulic servo is held at its value as of that time.

5. An automatic transmission control apparatus according to claim 1, wherein:

the differential speed change judging means further judges whether or not the change in differential speed is increasing, and upon each judgement that the differential speed is increasing, said pressure reducing means reduces the oil pressure of the hydraulic servo by a set pressure.

6. An automatic transmission control apparatus according to claim 2, wherein:

the differential speed change judging means further judges whether or not the change in differential speed is increasing, and upon each judgement that the differential speed is increasing, said pressure reducing means reduces the oil pressure of the hydraulic servo by a set pressure.

7. An automatic transmission control apparatus according to claim 3, wherein:

the differential speed change judging means further judges whether or not the change in differential speed is increasing, and upon each judgement that the differential speed is increasing, said pressure reducing means reduces the oil pressure of the hydraulic servo by a set pressure.

8. An automatic transmission control apparatus according to claim 1, wherein the control device further comprises:

release judging means; and initial pressure reduction means for gradually reducing the oil pressure to the hydraulic servo when a forward range is selected, subject to satisfaction of the following conditions: (1) the vehicle is at a standstill, (2) the engine is idling and (3) the clutch has been released to a predetermined extent by the pressure reduction effected by the initial pressure reduction means, as detected by the release judging means; and wherein the differential speed change judging means judges whether or not the differential speed has changed when the release judging means detects that the clutch has been released to said predetermined extent.

9. An automatic transmission control system which creates a neutral control state in a transmission gear-change mechanism which receives output of an engine through a fluid power transmission device, said control system creating the neutral control state responsive to selection of a forward travel range when the vehicle is at a standstill with the engine idling, said control system comprising:

a clutch in the transmission gear-change mechanism which is engaged when a forward travel range is selected;

a hydraulic servo, for engaging the clutch, actuated by oil pressure;

an input side speed sensor for detecting input side speed of the fluid power transmission device;

an output side speed sensor for detecting output side speed of the fluid power transmission device; and a control device, for controlling the oil pressure to the hydraulic servo, comprising:

initial pressure reduction means for reducing the oil pressure to the hydraulic servo when a forward range is selected and the vehicle is at a standstill with the engine idling;

release judging means for judging whether or not the clutch has been released to a predetermined extent by the pressure reduction effected by the initial pressure reduction means;

differential speed calculating means for calculating the differential speed between the detected input side speed and the detected output side speed of the fluid power transmission device;

initial pressure reduction stopping means for stopping the pressure reduction effected by the initial pressure reduction means when the clutch has been released to said predetermined extent;

setting means for setting the differential speed, as of when the pressure reduction is stopped, as a reference differential speed;

differential speed change judging means for, after the pressure reduction effected by the initial pressure reduction, judging at intervals of a set time whether or not the difference between the differential speed calculated by the differential speed calculating means at that time and the reference differential speed is below or greater than a predetermined value;

pressure increasing means for increasing the oil pressure of the hydraulic servo by a set pressure when said difference is below the predetermined value; and pressure reducing means for reducing the oil pressure of the hydraulic servo by a set pressure when said difference is greater than said predetermined value, wherein the differential speed change judging means resets the reference differential speed for calculating said difference to the new oil pressure valve set by each operation of the pressure increasing means and the pressure reducing means.

10. An automatic transmission control apparatus according to claim 9, wherein:

when said difference is greater than said predetermined value the differential speed change judging means further judges whether or not the differential speed is decreasing, and when the differential speed is decreasing the reduction in oil pressure by said pressure reducing means is cancelled and the oil pressure of the hydraulic servo is held at its value as of the time of said further judgement.

11. An automatic transmission control apparatus according to claim 9, wherein:

when said difference is greater than a set value the differential speed change judging means judges during the intervals of the set time whether or not the differential speed is increasing, and when the differential speed is increasing the oil pressure of the hydraulic servo is reduced by a set pressure and the reference differential speed for calculating said difference is reset to the reduced pressure.

12. An automatic transmission control apparatus according to claim 10, wherein:

when said difference is greater than a set value the differential speed change judging means judges during the intervals of the set time whether or not the differential speed is increasing, and when the differential speed is increasing the oil pressure of the hydraulic servo is reduced by a set pressure and the reference differential speed for calculating said difference is reset to the reduced pressure.

13. An automatic transmission control apparatus according to claim 8, wherein:

the control device further comprises delaying means for, during a set time following a judgement by the release judging means that the clutch has been released, (1) holding the oil pressure of the hydraulic servo at its value as of when the release judging means judged the clutch to have been released and (2) delaying the start of operation of the differential speed change judging means.

14. An automatic transmission control apparatus according to claim 9, wherein:

the control device further comprises delaying means for, during a set time following a judgement by the release judging means that the clutch has been released, (1) holding the oil pressure of the hydraulic servo at its value as of when the release judging means judged the clutch to have been released and (2) delaying the start of operation of the differential speed change judging means.

* * * * *

UNITED STATES PATENT AND TRADEMARK OFFICE
CERTIFICATE OF CORRECTION

PATENT NO. : 5,542,887
DATED : August 6, 1996
INVENTOR(S) : TSUKAMOTO et al

It is certified that error appears in the above-indentified patent and that said Letters Patent is hereby corrected as shown below:

ON THE FACE OF THE PATENT: "Appl. No.: 428,968" should read --Appl. No.: 428,698--.

Col. 7, line 15, "$R_2$and" should read --$R_2$ and--.

Col. 9, line 27, "ling" should read --line--.

Col. 16, line 6, "$\Delta P_\beta$are" should read --$\Delta P_\beta$ are--.

Signed and Sealed this

Twenty-fifth Day of March, 1997

Attest:

BRUCE LEHMAN

*Attesting Officer*  *Commissioner of Patents and Trademarks*